United States Patent
Aggarwal et al.

(10) Patent No.: US 12,167,241 B2
(45) Date of Patent: Dec. 10, 2024

(54) ENHANCED AUTHORIZATION IN CELLULAR COMMUNICATION NETWORKS

(71) Applicant: Nokia Technologies Oy, Espoo (FI)

(72) Inventors: Chaitanya Aggarwal, Munich (DE); Saurabh Khare, Bangalore (IN); Anja Jerichow, Grafing bei München (DE); Gerald Kunzmann, Augsburg (DE); Yannick Lair, Voisins le Bretonneux (FR)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 17/675,436

(22) Filed: Feb. 18, 2022

(65) Prior Publication Data

US 2022/0272537 A1  Aug. 25, 2022

(30) Foreign Application Priority Data

Feb. 19, 2021  (FI) ..................................... 20215183

(51) Int. Cl.
*H04W 12/069* (2021.01)
*H04L 9/40* (2022.01)
*H04W 12/08* (2021.01)

(52) U.S. Cl.
CPC ....... *H04W 12/069* (2021.01); *H04L 63/0281* (2013.01); *H04L 63/205* (2013.01); *H04W 12/08* (2013.01)

(58) Field of Classification Search
CPC . H04W 12/069; H04W 12/08; H04W 12/084; H04W 12/37; H04L 63/0281; H04L 63/205; H04L 63/101

(Continued)

(56) References Cited

U.S. PATENT DOCUMENTS

| | | | |
|---|---|---|---|
| 11,622,276 B1 * | 4/2023 | Wan ..................... | H04W 88/182 455/411 |
| 2020/0296571 A1 | 9/2020 | Puente Pestana et al. | |

(Continued)

FOREIGN PATENT DOCUMENTS

| | | |
|---|---|---|
| WO | 2020/254903 A1 | 12/2020 |
| WO | 2020/254918 A1 | 12/2020 |

OTHER PUBLICATIONS

Extended European Search Report received for corresponding European Patent Application No. 22154570.0, dated Jun. 1, 2022, 9 pages.

(Continued)

*Primary Examiner* — Don N Vo
(74) *Attorney, Agent, or Firm* — Barta Jones, PLLC

(57) ABSTRACT

According to an example aspect of the present invention, there is provided an apparatus comprising means for receiving from a requesting network function, by a network repository function, an access token request, wherein the access token request is related to a network function consumer requesting access to a service provided by a network function producer and comprises an identity of a vendor of the network function consumer requesting access to the service, means for verifying by the network repository function, based at least on the identity of the vendor of the network function consumer, that the network function consumer is allowed to access the service and means for transmitting to the requesting network function, by the network repository function, an access token upon successful verification, wherein the access token generated and signed by the network repository function comprises the identity of the vendor of the network function consumer and an identity of the vendor of the network function producer.

8 Claims, 6 Drawing Sheets

(58) Field of Classification Search
USPC .......................................................... 455/411
See application file for complete search history.

(56) References Cited

U.S. PATENT DOCUMENTS

| | | | | |
|---|---|---|---|---|
| 2021/0250344 | A1* | 8/2021 | Qi | H04W 12/06 |
| 2021/0288802 | A1* | 9/2021 | Muhanna | H04L 9/3263 |
| 2022/0295439 | A1* | 9/2022 | Zheng | H04L 67/51 |
| 2023/0019000 | A1* | 1/2023 | Li | H04W 12/10 |

OTHER PUBLICATIONS

"3rd Generation Partnership Project; Technical Specification Group Services and System Aspects; Security architecture and procedures for 5G system (Release 16)", 3GPP TS 33.501, V16.5.0, Dec. 2020, pp. 1-253.

"3rd Generation Partnership Project; Technical Specification Group Core Network and Terminals; 5G System; Network Function Repository Services; Stage 3 (Release 16)", 3GPP TS 29.510, V16.6.0, Dec. 2020, pp. 209.

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.2.0, Nov. 2020, pp. 1-11.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

"3rd Generation Partnership Project; Technical Specification Group Services and System Aspects; Procedures for the 5G System (5GS); Stage 2 (Release 16)", 3GPP TS 23.502, V16.7.1, Jan. 2021, pp. 1-603.

Office action received for corresponding Finnish Patent Application No. 20215183, dated Jul. 19, 2021, 12 pages.

"3rd Generation Partnership Project; Technical Specification Group Services and System Aspects; Security architecture and procedures for 5G system (Release 17)", 3GPP TS 33.501, V17.0.0, Dec. 2020, pp. 1-253.

"Vendor Speficif Features at NF Level", 3GPP TSG-CT WG4 Meeting #102-e, C4-211079, ZTE, Feb. 24-Mar. 5, 2021, 39 pages.

"3rd Generation Partnership Project; Technical Specification Group Core Network and Terminals; 5G System; Network Function Repository Services; Stage 3 (Release 17)", 3GPP TS 29.510, V17.0.0, Dec. 2020, pp. 1-229.

Office action received for corresponding Finnish Patent Application No. 20215183, dated Dec. 14, 2021, 10 pages.

* cited by examiner

ENHANCED AUTHORIZATION IN CELLULAR COMMUNICATION NETWORKS

FIELD

Various embodiments relate in general to cellular communication networks and more specifically, to authorization in such networks.

BACKGROUND

Authorization is needed in various communication networks to ensure that only users and network entities that have a right to access certain services can do that. Proper authorization needs to be ensured for example in core networks of cellular communication systems, such as in 5G core networks developed by the 3rd Generation Partnership Project, 3GPP. The 3GPP still develops 5G core networks and there is a need to provide improved methods, apparatuses and computer programs for enhancing authorization in 5G core networks. Such enhancements may be useful in other communication networks as well.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided an apparatus, comprising means for receiving from a requesting network function, by a network repository function, an access token request, wherein the access token request is related to a network function consumer requesting access to a service provided by a network function producer and comprises an identity of a vendor of the network function consumer requesting access to the service, means for verifying by the network repository function, based at least on the identity of the vendor of the network function consumer, that the network function consumer is allowed to access the service and means for transmitting to the requesting network function, by the network repository function, an access token upon successful verification, wherein the access token generated and signed by the network repository function comprises the identity of the vendor of the network function consumer and an identity of the vendor of the network function producer. The apparatus may comprise the network repository function, or a control device configured to control the functioning thereof, possibly when installed therein.

Embodiments of the first aspect may comprise at least one feature from the following bulleted list or any combination of the following features:

- the apparatus may further comprise means for receiving from the network function producer or as an operator configuration, by the network repository function, a list of identities of vendors of which network functions are allowed to access the service provided by the network function producer and means for verifying, by the network repository function, that the network function consumer is allowed to access the service when the identity of the vendor of the network function consumer is in the list;
- said verifying that the network function consumer is allowed to access the service is further based on a profile of the network function producer;
- the apparatus may further comprise means for receiving from the requesting network function, by the network repository function, a discovery request related to the network function producer, the discovery request comprising the identity of the vendor of the network function consumer, means for verifying based on the identity of the vendor of the network function consumer, by the network repository function, that the network function consumer is allowed to discover the network function producer and means for transmitting upon successful verification, by the network repository function, a discovery response to the requesting network function;
- the access token request further comprises an identity of a vendor of the network function producer providing the service and said verifying that the network function consumer is allowed to access the service is further based on the identity of the vendor of the network function producer.

According to a second aspect of the present invention, there is provided an apparatus, comprising means for transmitting, by a requesting network function, an access token request to a network repository function, wherein the access token request is related to a network function consumer requesting access to a service provided by a network function producer and the access token comprises an identity of a vendor of the network function consumer requesting access to the service, means for receiving, by the requesting network function, an access token from the network repository function, wherein the access token signed by the network repository function comprises the identity of the vendor of the network function consumer and the identity of the vendor of the network function producer, means for transmitting, by the requesting network function, the signed access token to the network function producer to request access to the service and means for receiving, by the requesting network function, the service from the network function producer when the network function consumer is allowed by the network function producer to access the service. The apparatus may comprise the requesting network function, such as a network function consumer or a service communication proxy configured to act on behalf of the network function consumer, or a control device configured to control the functioning thereof, possibly when installed therein.

Embodiments of the second aspect may comprise at least one feature from the following bulleted list or any combination of the following features:

- the apparatus may further comprise means for transmitting, by the requesting network function, a discovery request to request discovery of the network function producer, the discovery request comprising the identity of the vendor of the network function consumer and means for receiving, by the requesting network function, a discovery response responsive to the discovery request;
- the access token request further comprises an identity of a vendor of the network function producer providing the service.

According to a third aspect of the present invention, there is provided an apparatus, comprising means for receiving from a requesting network function, by a network function producer providing a service, a signed access token, wherein the access token signed by a network repository function is related to a network function consumer requesting access to a service provided by a network function producer and comprises an identity of a vendor of the network function consumer and an identity of a vendor of the network function producer, means for verifying by the network function producer, based on the identity of the vendor of the network function consumer and the identity of the vendor of a network function producer, that the network function consumer is allowed to access the service and means for providing, by the network function producer, the service to the network function consumer upon successful verification. The apparatus may comprise the network function producer, such as a network data analytics function, or a control device configured to control the functioning thereof, possibly when installed therein. The apparatus may further comprise means for transmitting to the network repository function, by the network function producer, a list of identities of vendors of which network functions are allowed to access the service provided by the network function producer.

According to an aspect of the present invention, there is provided a first method corresponding to the first aspect, comprising receiving from a requesting network function, by a network repository function, an access token request, wherein the access token request is related to a network function consumer requesting access to a service provided by a network function producer and comprises an identity of a vendor of the network function consumer requesting access to the service, verifying by the network repository function, based at least on the identity of the vendor of the network function consumer, that the network function consumer is allowed to access the service and transmitting to the requesting network function, by the network repository function, an access token upon successful verification, wherein the access token generated and signed by the network repository function comprises the identity of the vendor of the network function consumer and an identity of the vendor of the network function producer. The first method may be performed by the network repository function, or a control device configured to control the functioning thereof, possibly when installed therein.

According to an aspect of the present invention, there is provided a second method corresponding to the second aspect, comprising transmitting, by a requesting network function, an access token request to a network repository function, wherein the access token request is related to a network function consumer requesting access to a service provided by a network function producer and the access token comprises an identity of a vendor of the network function consumer requesting access to the service, receiving, by the requesting network function, an access token from the network repository function, wherein the access token signed by the network repository function comprises the identity of the vendor of the network function consumer and an identity of the vendor of the network function producer, transmitting, by the requesting network function, the signed access token to the network function producer to request access to the service and receiving, by the requesting network function, the service from the network function producer when the network function consumer is allowed by the network function producer to access the service. The second method may be performed by the network function consumer or a service communication proxy configured to act on behalf of the network function consumer, or a control device configured to control the functioning thereof, possibly when installed therein.

According to an aspect of the present invention, there is provided a third method corresponding to the third aspect, comprising receiving from a requesting network function, by a network function producer providing a service, a signed access token, wherein the access token signed by a network repository function is related to a network function consumer requesting access to a service provided by a network function producer and comprises an identity of a vendor of the network function consumer and an identity of a vendor of the network function producer, verifying by the network function producer, based on the identity of the vendor of the network function consumer and the identity of the vendor of a network function producer, that the network function consumer is allowed to access the service and providing, by the network function producer, the service to the network function consumer upon successful verification. The third method may be performed the network function producer, such as a network data analytics function, or a control device configured to control the functioning thereof, possibly when installed therein.

According to an aspect of the present invention, there is provided an apparatus corresponding to the first aspect, comprising at least one processing core, at least one memory including computer program code, the at least one memory and the computer program code being configured to, with the at least one processing core, cause the apparatus at least to perform, receive from a requesting network function, by a network repository function, an access token request, wherein the access token request is related to a network function consumer requesting access to a service provided by a network function producer and comprises an identity of a vendor of the network function consumer requesting access to the service, verify by the network repository function, based at least on the identity of the vendor of the network function consumer, that the network function consumer is allowed to access the service and transmit to the requesting network function, by the network repository function, an access token upon successful verification, wherein the access token generated and signed by the network repository function comprises the identity of the vendor of the network function consumer and an identity of the vendor of the network function producer. The apparatus may comprise the network repository function, or a control device configured to control the functioning thereof, possibly when installed therein.

According to an aspect of the present invention, there is provided an apparatus corresponding to the second aspect, comprising at least one processing core, at least one memory including computer program code, the at least one memory and the computer program code being configured to, with the at least one processing core, cause the apparatus at least to perform, transmit, by a requesting network function, an access token request to a network repository function, wherein the access token request is related to a network function consumer requesting access to a service provided by a network function producer and the access token comprises an identity of a vendor of the network function consumer requesting access to the service, receive, by the requesting network function, an access token from the network repository function, wherein the access token signed by the network repository function comprises the identity of the vendor of the network function consumer and an identity of the vendor of the network function producer, transmit, by the requesting network function, the signed access token to the network function producer to request access to the service and receive, by the requesting network function, the service from the network function producer when the network function consumer is allowed by the network function producer to access the service. The apparatus may comprise the requesting network function, such as network function consumer or a service communication proxy configured to act on behalf of the network function consumer, or a control device configured to control the functioning thereof, possibly when installed therein.

According to an aspect of the present invention, there is provided an apparatus corresponding to the third aspect, comprising at least one processing core, at least one memory including computer program code, the at least one memory and the computer program code being configured to, with the at least one processing core, cause the apparatus at least to perform, receive from a requesting network function, by a network function producer providing a service, a signed access token, wherein the access token signed by a network repository function is related to a network function consumer requesting access to a service provided by a network function producer and comprises an identity of a vendor of the network function consumer and an identity of a vendor of the network function producer, verify by the network function producer, based on the identity of the vendor of the network function consumer and the identity of the vendor of a network function producer, that the network function consumer is allowed to access the service and provide, by the network function producer, the service to the network function consumer upon successful verification. The apparatus may comprise the network function producer, such as a network data analytics function, or a control device configured to control the functioning thereof, possibly when installed therein.

The requesting network function may be the network function consumer or a service communication proxy configured to act on behalf of the network function consumer. The service may be a machine learning service. Alternatively, or in addition, the service may be a vendor-specific service which is used by different vendors.

According to an aspect of the present invention, there is provided a non-transitory computer readable medium having stored thereon a set of computer readable instructions that, when executed by at least one processor, cause an apparatus to at least perform the first, second, or third method. According to an aspect of the present invention, there is provided a computer program comprising instructions which, when the program is executed by an apparatus, cause the apparatus to carry out the first, second or third method.

EMBODIMENTS

Authorization may be improved by the procedures described herein. More specifically, authorization may be improved by exploiting information about a vendor Identity, ID, of a Network Function consumer, NFc, requesting access to a service, and possibly a vendor ID of a Network Function producer, NFp, providing the service. A Network Repository Function, NRF, may, e.g., verify that an access token request is allowable and an access token should be generated based on an ID of a vendor of the NFc, and possibly a policy related to an ID of the vendor of the NFp. For instance, the NRF may determine a list of IDs of vendors of which Network Functions, NFs, are allowed to access the service provided by the NFp and then check that the ID of the vendor of the NFc is in that particular list. Authorization may be therefore enabled for single- and multi-vendor environments, which is beneficial for example when sharing vendor-specific services associated with sensitive data, such as trained Machine Learning, ML, models, between NFs of different vendors.

Figure 1:
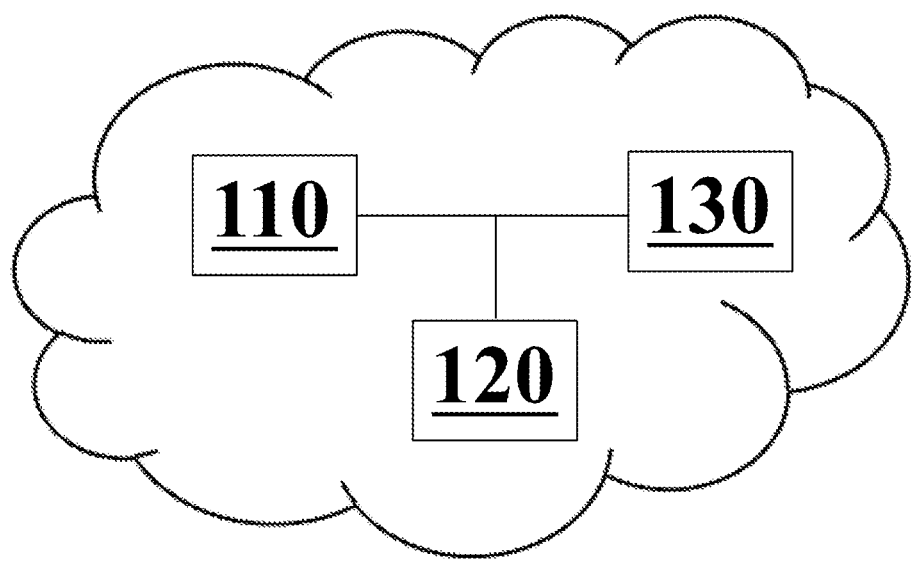
FIG. 1 illustrates an example of a communication system in accordance with at least some embodiments.

FIG. 1 illustrates an example of a communication system in accordance with at least some embodiments. In FIG. 1, NFc 110, NRF 120 and NFp 130 are shown. NFc 110 may be a NFc requesting access to a service provided by NFp 130. Thus, NFc 110 may be a requesting NF in general. In some embodiments, tasks of NFc 110 may be performed by a Service Communication Proxy, SCP, which is configured to act on behalf of NFc 110. That is, in some embodiments, the requesting NF may be the SCP as well. Moreover, in some embodiments, NFc 110 and NFp 130 may be Network Data Analytics Functions, NWDAFs, configured to provide and/or exploit said vendor-specific services.

NFc 110, NRF 120 and NFp 130 may be in the same network, such as in the same Public Land Mobile Networks, PLMN, or in different networks. NFc 110, NRF 120 and NFp 130 may be configured to operate according to at least one cellular communication standard. More specifically, NFc 110, NRF 120 and NFp 130 may be located in a core network of a cellular communication system, such as in a core network operating in accordance with at least one standard defined by the 3$^{rd}$ Generation Partnership Project, 3GPP, like a 5G or a 6G standard, and configured to operate according to the at least one 3GPP standard. NFc 110, NRF 120 and NFp 130 may be connected to each other via at least one wired connection and/or wireless connection, and communicate with each other via said connection(s).

NFc 110, NRF 120 and NFp 130 may be NFs which refer to an operational and/or a physical entity. An NF may be a specific network node or element, or a specific function or set of functions carried out by one or more entities, such as Virtual Network Functions, VNFs. One physical apparatus may be configured to perform tasks of multiple NFs.

As an example, in case of a 3GPP Service-Based Architecture, SBA, of 5G core networks, but not limited to, one issue is related to sharing of trained ML models between NFc 110 and NFp 130 when NFc 110 and NFp 130 are NWDAFs of different vendors. For instance, in the eNA Phase 2 study, 3GPP TR 23.700-91, Key Issue 19 describes trained model sharing between multiple NWDAF Instances. However, the model sharing should not be limited to a single-vendor environment. Particularly as NWDAF instances may discover other NWDAF instances providing ML models via NRF 120, there should be a solution for enabling secure and authorized sharing for multi-vendor environments as well using SBA or any other architecture. Sharing of trained ML models is not a specific issue of SBA and hence, similar issues may need to be addressed in other architectures as well.

For instance, NRF 120 should be able to verify a vendor of NFc 110 when NFc 110 requests discovery of NFp 130.

Moreover, there should be mechanism for ensuring that ML trained models are only shared between the NWDAF instances of the same vendor or with an authorized list of vendors. Since machine learning models are trained using proprietary algorithms, and sometimes may also be trained using sensitive data, securing them and ensuring restricted and safe transfer is paramount. Embodiments of the present invention may be exploited in other contexts as well, as authorization in multi-vendor environments is enabled such that different vendor-specific services, like trained ML models, may be shared in a secure manner between NFs of vendors.

Figure 2:
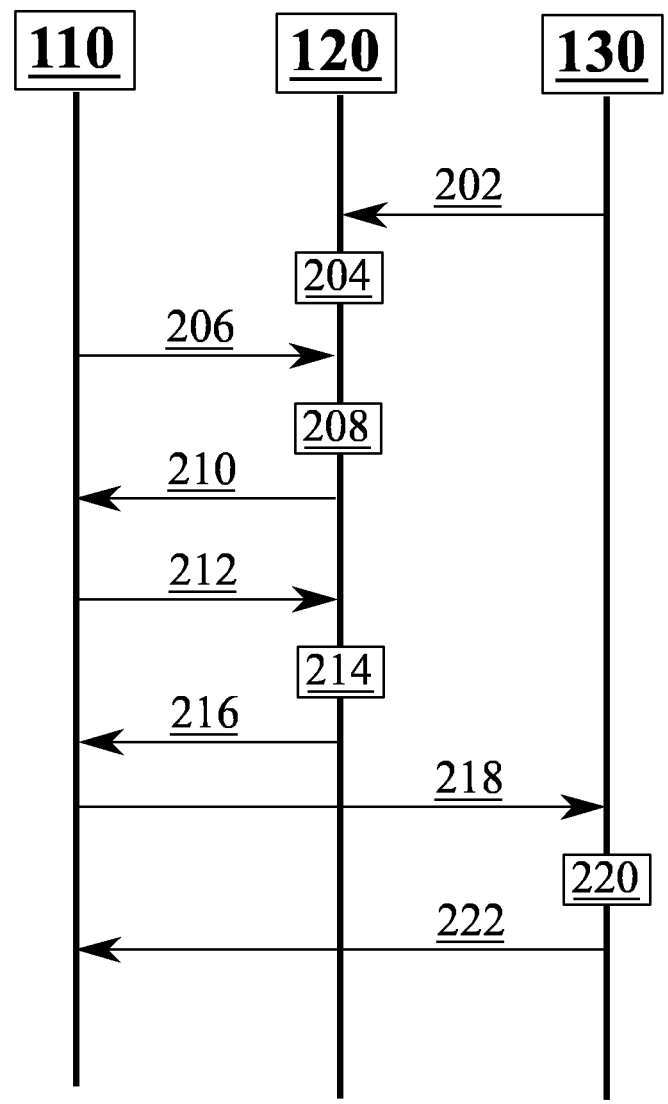
FIG. 2 illustrates a signalling graph in accordance with at least some embodiments.

FIG. 2 illustrates a signalling graph in accordance with at least some embodiments. With reference to FIG. 1, on the vertical axes are disposed, from the left to the right, NFc 110, NRF 120 and NFp 130. Time advances from the top towards the bottom. Even though NFc 110 is used as an example of a requesting NF in FIG. 2, the steps of NFc 110 may be performed by any other requesting NF as well, such as the SCP configured to act on behalf of NFc 110.

At step 202, NFp 130 may transmit to NRF 120 a list of identities, IDs, of vendors of which NFs are allowed to access the service provided by NFp 130. That is, the list of vendors of which NFs are allowed to access the service may be prepared and provided to NRF 120 by a vendor of NFp 130, by NFp 130 or by the operator, i.e., NFp 130 may be configured to only share for example the trained ML models with NFs of vendors on the list. For instance, a NF Profile or a NF Service Type Definition (part of NF Profile) as in 3GPP TS 29.510 may be enhanced to include the list of vendors of which NFs may access the service. Thus, NFp 130, such as an NWDAF providing trained ML models, may indicate the vendors with which the NWDAF may share its trained ML model when registering in NRF 120 the trained model sharing service such as Nnwdaf TrainedModelSharing service. Alternatively, the operator may have indicated in a policy to NRF 120 the vendors of NFs with which another vendor of NF can share a service.

NFp 130 may transmit the list as a part of a registration procedure with NRF 120, for example while registering its profile/service profile in NRF 120. The list may be provided at discovery and exploited by NFc 110, or the SCP configured to act on behalf of NFc 110, to discover NFp 130, such as the NWDAF Instance, and request/retrieve additional access token authorizations which may be required to request a service, like a trained ML model, based on authorization information registered in NRF 120 by NFp 130 in its NF profile. The list of authorized vendor IDs may be registered in NRF 120, e.g. within an NF Service attribute of NFp 130 for Type: NFService that is part of the NF Profile or NFp 130. Thus, Table 6.1.6.2.3-1 or Table 6.1.6.2.2-1 in 3GPP TS 29.510 may be enhanced as follows:

| Attribute name | Data type | P | Cardinality | Description |
|---|---|---|---|---|
| allowed-Vendors | array (String) | O | 1 ... N | List of allowed Vendor IDs whose NFs can access the service/Profile. |

For example, if operator policies allow only a single vendor environment, but not multiple vendors where some data needs to be shared between the same vendor, then the allowedVendors parameter may only contain the vendor ID of NFp 130 itself. Else, if there are mutual agreements between different vendors, the allowedVendors parameter may contain the IDs of all the allowed vendors (including itself).

At step 204, NRF 120 may store the list to a memory of an apparatus. The memory of the apparatus may be a memory of an apparatus comprising NRF 120 or a control device configured to control the functioning thereof, possibly when installed therein. In some embodiments, the memory of the apparatus may be an external memory, accessible remotely via a communication network.

At step 206, NFc 110 may transmit to NRF 120 a discovery request related to NFp 130, the discovery request comprising an ID of a vendor of NFc 110 requesting access to a service provided by NFp 130, and possibly an ID of a vendor of NFp 130 providing the service, i.e., target NF vendor ID(s). That is, NFc 110 may transmit the discovery request to request discovery of NFp 130. In some embodiments, the discovery request may be used to discover the service or NFp 130.

For instance, 3GPP TS 23.502 Clause 5.2.7.3.2 defines the Nnrf_NFDiscovery_Request service operation, and optional input parameters therein may be enhanced to include two more, i.e., the vendor ID of target NFp 130 to be used by NRF 120 for example to discover a corresponding NWDAF Instance of the target vendor ID, and the vendor ID of the requesting NFc.

The vendor ID of requesting NFc 110 may be used by NRF 120 to verify if NFc 110 is even allowed to discover target NFp 130 or service provided by target NFp 130. According to some embodiments, Table 6.2.3.2.3.1-1 in 3GPP TS 29.510 may be enhanced by adding the following parameters:

| Name | Data type | P | Cardinality | Description |
|---|---|---|---|---|
| requesternf-vendor-id | NfVendorId | O | 0 ... 1 | The NF service consumer shall include this IE when triggering discovery request of a service known to be vendor specific (e.g. trained model sharing service) or when triggering discovery request of an NWDAF When present, this IE shall contain the Vendor ID of the requester NF service consumer. |
| target-nf-vendor-id | array (NfVendorId) | O | 0 ... 1 | The NF service consumer shall include this IE when triggering discovery request of a service known to be vendor specific (e.g. trained model sharing service) or when triggering discovery request of an NWDAF When present, this IE shall contain the Vendor ID of the target NF service consumer. |

As an example, in case of a discovery of a trained model sharing service, NFc 110 may include its vendor ID (requester-nf-vendor-id) to the discovery request (Nnrf_NFDiscovery_Request). NFc 110 knows that the trained model sharing service is vendor-specific and therefore, NFc 110 may include its own vendor ID from its configuration. NRF 120 may then check, based on the vendor ID of NFc 110, which trained model sharing services can be returned back to NFc 110 or which NFp can be returned back to NFc 110, i.e. NRF 120 may return only those services which have the vendor of NFc 110 as an allowed vendor or NRF 120 may return only those NFp(s) which have the vendor of NFc 110 as an allowed vendor depending on the profile information of NFp 130 or the operator policy for vendor ID of NFp 130.

In some embodiments, NFc 110 may also include the vendor ID of target NFp 130 to the discovery request when, by configuration, NFc 110 knows that it can access trained model sharing services from selected different vendors.

As another example, in case of a discovery of NWDAF, NFc 110 may include its vendor ID (requester-nf-vendor-id) to the discovery request (Nnrf_NFDiscovery_Request) for all discovery requests related to the NWDAF to be discovered. NFc 110 may also include the vendor ID of target NFp 130 when, by configuration, NFc 110 knows that it can access trained model sharing services from selected different vendors. NRF 120, when checking whether the registered NWDAF is available, may check if some NWDAFs have services restricted to some vendors or if some NWDAFs are restricted to some vendors. If no, then all NWDAF matching criteria from NFc 110 may be returned. Otherwise, NRF 120 may return all NWDAF matching criteria from NFc 110 and that have no restriction to some vendors.

In some embodiments, NRF 120 may also be configured to associate an ID of NFc 110, such as a NF Instance ID, with the vendor ID of NFc 110. That is, NRF 120 may link the ID of NFc 110 to the ID of the vendor of NFc 110 and store the vendor ID of NFc 110 together with the ID of NFc 110. For instance, NRF 120 may associate the ID of NFc 110 with the vendor ID of NFc 110 when NFc 110 registers to NRF 110 or upon receiving a discovery request from NFc 110 including its vendor ID. In such a case, NRF 120 may check later on that a vendor ID of NFc 110, received for example in an access token request, matches the stored vendor ID of NFc 110. Thus, if a malicious NF tries to masquerade its vendor ID, NRF 120 may reject the request upon unsuccessful verification of the access token request, thereby enabling secure sharing of vendor-specific services.

At step 208, NRF 120 may verify, based on the ID of the vendor of NFc 110, and possibly the ID of the vendor of NFp 130 if received in the discovery request, that the discovery request of NFc 110 is allowable. For instance, NRF 120 may check which services are allowed for NFs of the vendor of NFc 110 and verify the allowed services but not necessarily all. Alternatively, or in addition, NRF 120 may verify that the received vendor IDs match the information present in the NFService or the NF profile of NFc 110. NRF 120 may verify that NFc 110 is allowed to discover NFp 130 for example when the ID of the vendor of NFc 110 is in the list of IDs of vendors of which NFs are allowed to access the service provided by NFp 130. At step 210, NRF 120 may transmit, upon successful verification, a discovery response to NFc 110, the discovery response comprising for example an address of NFp 130 and some parameters from the profile of NFp 130.

At step 212, NFc 110 may transmit an access token request to NRF 120 to request an access token, wherein the access token request is related to accessing the service provided by NFp 130 and comprises the ID of the vendor of NFc 110 requesting access to the service, and possibly the ID of the vendor of NFp 130 providing the service. That is, NFc 110 may transmit the access token to request access to the service provided by NFp 130. The access token request may comprise the ID of the vendor of NFp 130, because NFc 110 may have similar to NFp 130 some restrictions on the vendors, so NFc 110 can indicate this in its service request and the access token may be only provided if it matches policy of NFp 130 and request of NFc 110.

NRF 120 may then generate an access token for NFc 110 once the vendor ID of NFc 110 has been verified by NRF 120 using its local policy or profile data of NFp 130, such as the list of IDs of vendors of which NFs are allowed to access the service provided by NFp 130.

For instance, the Nnrf_AccessToken_Get request may be enhanced to include the vendor ID of NFc 110, such as a requester NWDAF Instance, and possibly the vendor ID of NFp 130, such as a sender/service producing NWDAF Instance. In case of an indirect communication scenario with delegated discovery, wherein the SCP may be configured to act on behalf of NFc 110, the access token request procedure may also be enhanced similarly as described in the clause 13.4.1.3.2 in TS 33.501, wherein the SCP sends an access token request on behalf of the NFc.

Table 6.3.5.2.2-1 in 3GPP TS 29.510 may be enhanced as follows to include the vendor ID of NFc 110 (requesterNFVendorID) and the vendor ID of NFp 130 (targetNFVendorID).

| Attribute name | Data type | P | Cardinality | Description |
|---|---|---|---|---|
| requesterNF-VendorID | VendorId | C | 0 . . . 1 | When present, this IE shall contain the Vendor ID of the requestor NF Service Consumer. |
| targetNF-VendorID | VendorId | C | 0 . . . N | When present, this IE shall contain the Vendor ID of the target NF Service Producer. |

At step 214, NRF 130 may verify, based on the ID of the vendor of NFc 110, and possibly the ID of the vendor of the NFp 130, that NFc 110 is allowed to access the service of NFp 130. For instance, NRF 120 may verify that NFc 110 is allowed to access the service provided by NFp 130 when the ID of the vendor of NFc 110 is in the list of IDs of vendors of which NFs are allowed to access the service provided by NFp 130. In some embodiments, NRF 120 may retrieve the list from the memory of the apparatus using the ID of the vendor of NFp 130 upon receiving the access token request and perform the verification after that. In some embodiments, NRF 120 may have local policy to allow or restrict the communication between NFs of different vendors or the same vendor.

NRF 120 may generate an access token upon successful verification. The generated access token may comprise two additional claims, such as the vendor ID of NFc 110 and the vendor ID of NFp 130 (or a list of Vendor IDs). The vendor ID of NFp 130 may be the same as the vendor ID of NFc 110 in case of single-vendor sharing of ML models. Alternatively, the vendor ID of NFp 130 may be different compared to the vendor ID of NFc 110 and in such a case the vendor ID of NFc 110 may be in the list of the vendor IDs that NFp 130 transmitted to NRF 120 at step 202. As an example, an NWDAF providing trained models may have registered with its profile the list. The list may be based upon a policy of an operator. The access token may be signed by NRF digitally. In some embodiments, the access token may be an OAuth 2.0 access token.

According to some embodiments, Table 6.3.5.2.4-1 in 3GPP TS 29.510 may be enhanced as follows to include the vendor ID of NFc 110 (requesterVendorID) and the vendor ID of NFp 130 (targetVendorID).

| Attribute name | Data type | P | Cardi-nality | Description |
|---|---|---|---|---|
| requester-VendorID | VendorId | C | 0 . . . 1 | This IE shall be included if the NRF supports providing Vendor ID of the NF service consumer in the access token claims. If an NF service producer that receives this IE in the token included in the authorization header does not understand this IE, it shall be ignored. |
| producer-VendorId | Array (VendorId) | O | 0 . . . 1 | This IE shall be included if the NRF supports providing Vendor ID(s) of the NF service producer in the access token claims. |

At step 216, upon successful verification, NRF 120 may transmit the access token signed by NRF 120, wherein the signed access token comprises the ID of the vendor of NFc 110 and the ID of the vendor of NFp. At step 218, NFc 110 may transmit the signed access token to NFp 130 to request the service from NFp 130.

At step 220, NFp 130 may verify based on the ID of the vendor of NFc 110 and the ID of the vendor of NFp 130 that NFc 110 is allowed to access the service. In some embodiments, the access token may be verified by NFp 130 by checking that the vendor ID of the requested NF, i.e., NFp 130, in the access token matches the ID of NFp 130 and that the vendor ID of NFc 110 is in the list of vendors of which NFs are allowed to access the service provided by NFp 130. Thus, an additional check by NFp 130 is also enabled, if for example NFp 130 does not trust the access token generated by NRF 120.

NFp 130 may have stored the list to a memory of an apparatus beforehand, to enable verification using the list. The memory of the apparatus may be a memory of an apparatus comprising NFp 130 or a control device configured to control the functioning thereof, possibly when installed therein. In some embodiments, the memory of the apparatus may be an external memory, accessible remotely via a communication network.

Upon successful verification, NFp 130 may provide, at step 222, the requested service, such as a trained ML model, to NFc 110, in a service response. If the verification is not successful, NFp 130 may respond by transmitting an error code.

Figure 3:
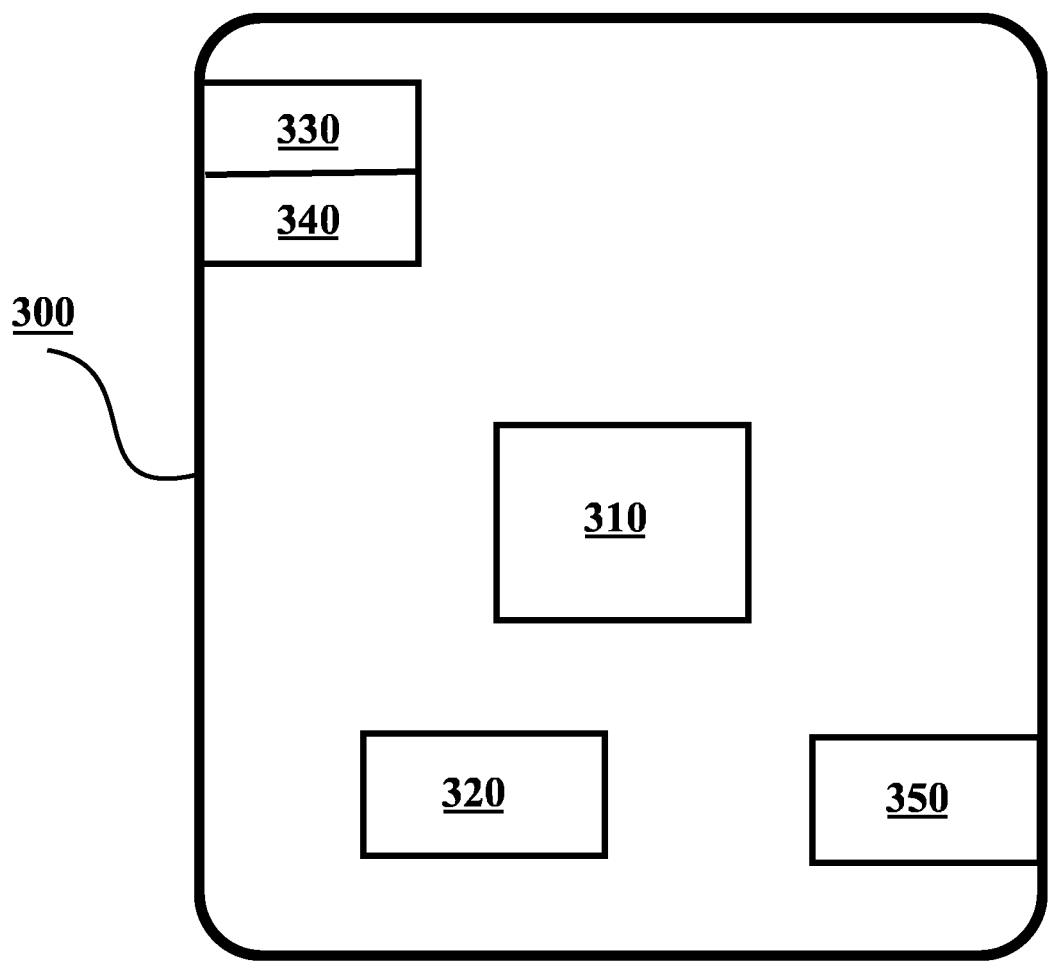
FIG. 3 illustrates an example apparatus capable of supporting at least some embodiments.

FIG. 3 illustrates an example apparatus capable of supporting at least some embodiments. Illustrated is device 300, which may be or comprise, for example, NFc 110, NRF 120 or NFp 130, or a device controlling functioning thereof, possibly when installed therein. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. Processor 310 may comprise at least one Application-Specific Integrated Circuit, ASIC. Processor 310 may comprise at least one Field-Programmable Gate Array, FPGA. Processor 310 may comprise an Intel Xeon processor for example. Processor 310 may be means for performing method steps in device 300, such as determining, causing transmitting and causing receiving. Processor 310 may be configured, at least in part by computer instructions, to perform actions. For instance, if device 300 comprises NRF 120 or NFp 130, processor 310 may be configured to verify that NFc 110 is allowed to access the service.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular standard, such as a standard defined by the 3GPP. Transmitter 330 may comprise more than one transmitter. Receiver 340 may comprise more than one receiver. Transmitter 330 and/or receiver 340 may be configured to operate in accordance with a suitable communication standard.

For instance, transmitter 330 may be configured to transmit the access token or perform any other transmitting step. Similarly, receiver 340 may be configured for example to receive the access token request or perform any other receiving step. Transmitter 330 and receiver 340 may be configured together to retrieve remotely the list of IDs of vendors of which NFs are allowed to access the service.

Device 300 may comprise User Interface, UI, 350. UI 350 may comprise at least one of a display, a keyboard, a touchscreen, a vibrator arranged to signal to a user by causing device 300 to vibrate, a speaker or a microphone. A user may be able to operate device 300 via UI 350, for example to configure device 300 and/or functions it runs.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above. For example, device 300 may not have UI 350.

Processor 310, memory 320, transmitter 330, receiver 340 and/or UI 350 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
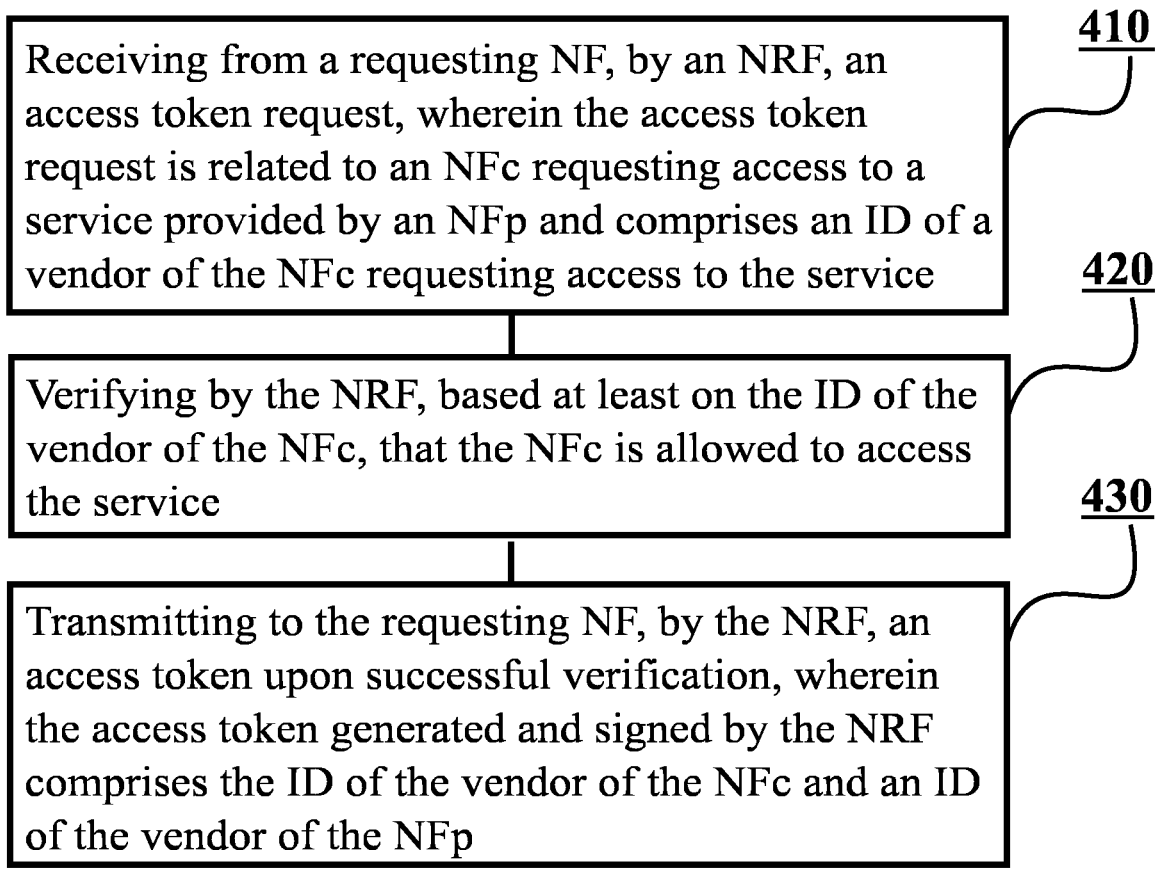
FIG. 4 illustrates a flow graph of a first method in accordance with at least some embodiments.

FIG. 4 is a flow graph of a first method in accordance with at least some embodiments. The phases of the illustrated first method may be performed by NRF 120 or a device controlling functioning thereof, possibly when installed therein.

The first method may comprise, at step 410, receiving from a requesting network function, by a network repository function, an access token request, wherein the access token request is related to a network function consumer requesting access to a service provided by a network function producer and comprises an identity of a vendor of the network function consumer requesting access to the service. The first method may also comprise, at step 420, verifying by the network repository function, based at least on the identity of the vendor of the network function consumer, that the network function consumer is allowed to access the service. Finally, the first method may comprise, at step 430, transmitting to the requesting network function, by the network repository function, an access token upon successful verification, wherein the access token generated and signed by the network repository function comprises the identity of the vendor of the network function consumer and an identity of the vendor of the network function producer.

Figure 5:
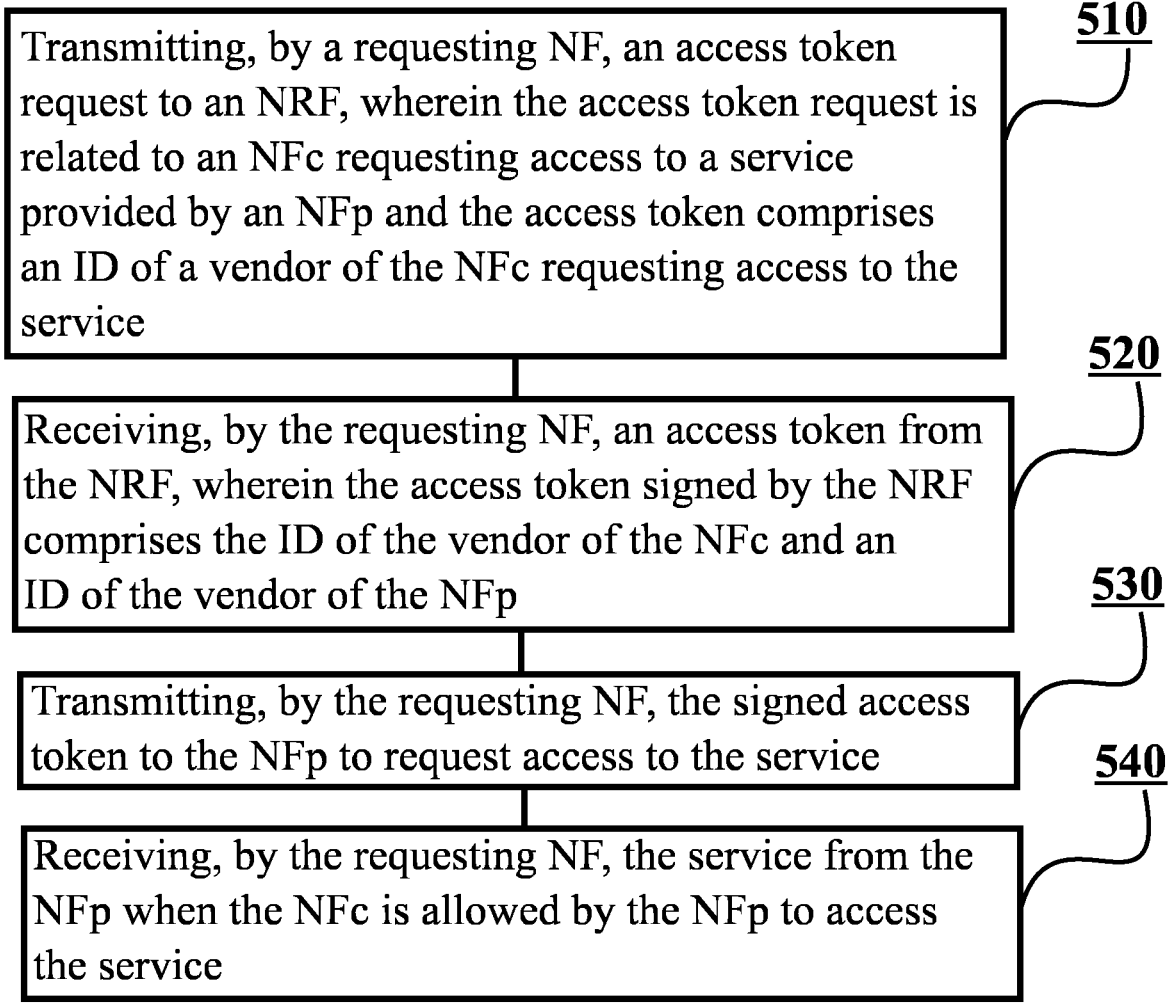
FIG. 5 illustrates a flow graph of a second method in accordance with at least some embodiments.

FIG. 5 is a flow graph of a second method in accordance with at least some embodiments. The phases of the illustrated second method may be performed by NFc 110 or a device controlling functioning thereof, possibly when installed therein.

The second method may comprise, at step 510, transmitting, by a requesting network function, an access token request to a network repository function, wherein the access token request is related to a network function consumer requesting access to a service provided by a network function producer and the access token comprises an identity of a vendor of the network function consumer requesting access to the service. The second may also comprise, at step 520, receiving, by the requesting network function, an access token from the network repository function, wherein the access token signed by the network repository function comprises the identity of the vendor of the network function consumer and an identity of the vendor of the network function producer. Moreover, the second method may comprise, at step 530, transmitting, by the requesting network function, the signed access token to the network function producer to request access to the service. Finally, the second may comprise, at step 540, receiving, by the requesting network function, the service from the network function producer when the network function consumer is allowed by the network function producer to access the service.

Figure 6:
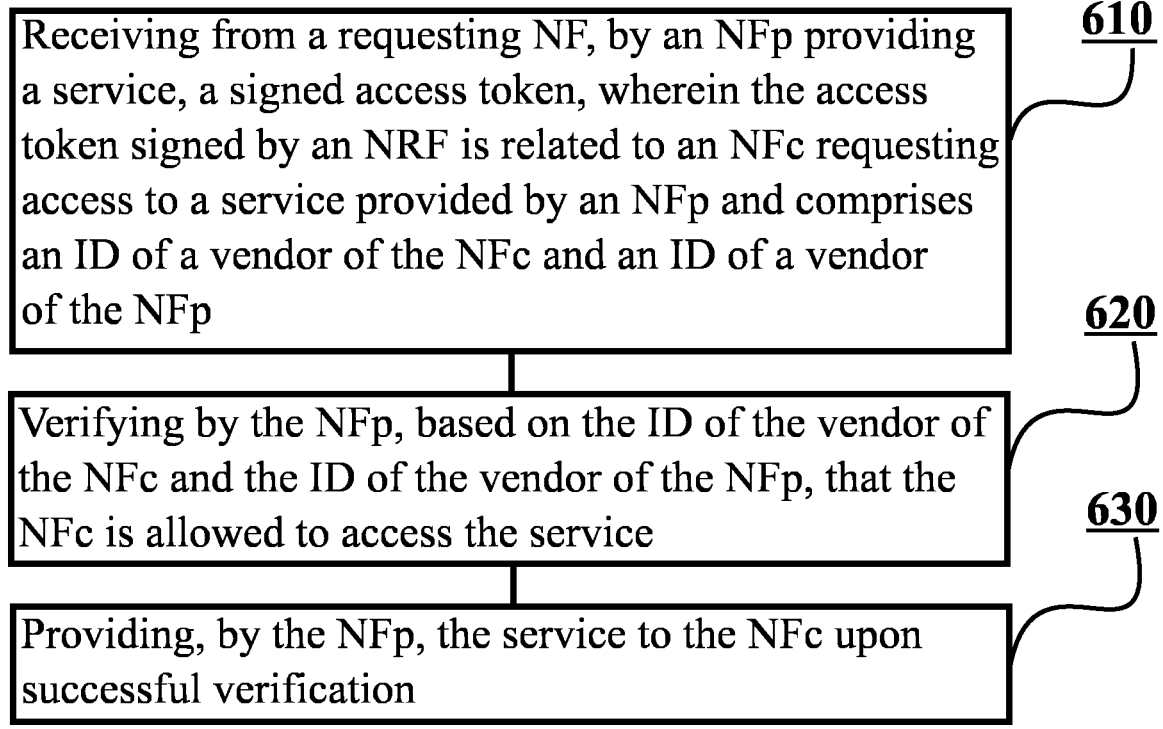
FIG. 6 illustrates a flow graph of a third method in accordance with at least some embodiments.

FIG. 6 is a flow graph of a third method in accordance with at least some embodiments. The phases of the illustrated third method may be performed by NFp 130 or a device controlling functioning thereof, possibly when installed therein.

The third method may comprise, at step 610, receiving from a requesting network function, by a network function producer providing a service, a signed access token, wherein the access token signed by a network repository function is related to a network function consumer requesting access to a service provided by a network function producer and comprises an identity of a vendor of the network function consumer and an identity of a vendor of the network function producer. The third method may also comprise, at step 620, verifying by the network function producer, based on the identity of the vendor of the network function consumer and the identity of the vendor of a network function producer, that the network function consumer is allowed to access the service. Finally, the third method may comprise, at step 630, providing, by the network function producer, the service to the network function consumer upon successful verification.

It is to be understood that the embodiments disclosed are not limited to the particular structures, process steps, or materials disclosed herein, but are extended to equivalents thereof as would be recognized by those ordinarily skilled in the relevant arts. It should be also understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an embodiment, an apparatus, comprising for example NFc 110, NRF 120 or NFp 130, may further comprise means for carrying out the embodiments described above and any combination thereof. The apparatus may be an apparatus of a cellular communication network, such as a 5G network, and comprise means for operating in the cellular communication network.

In an embodiment, a computer program comprising instructions which, when the program is executed by a computer, cause the computer to carry out a method in accordance with the embodiments described above and any combination thereof. In an embodiment, a computer program product, embodied on a non-transitory computer readable medium, may be configured to control a processor to perform a process comprising the embodiments described above and any combination thereof.

In an embodiment, an apparatus, comprising for example NFc 110, NRF 120 or NFp 130, may further comprise at least one processor, and at least one memory including computer program code, wherein the at least one memory and the computer program code are configured to, with the at least one processor, cause the apparatus at least to perform the embodiments described above and any combination thereof. The apparatus may be an apparatus of a cellular communication network, such as a 5G network, and configured to operate in the cellular communication network.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some embodiments find industrial application in cellular communication networks, such as 5G networks, and possibly in other cellular communication networks in the future, such as 6G networks, as well.

ACRONYMS LIST

3GPP 3$^{rd}$ Generation Partnership Project
ID Identity
ML Machine Learning
NF Network Function
NFc Network Function consumer
NFp Network Function producer
NRF Network Repository Function
NWDAF Network Data Analytics Function
PLMN Public Land Mobile Network
SBA Service-Based Architecture
SCP Service Communication Proxy
VNF Virtual Network Function

REFERENCE SIGNS LIST

| 110 | NFc |
|---|---|
| 120 | NRF |
| 130 | NFp |
| 200-222 | Steps in FIG. 2 |
| 300-350 | Structure of the apparatus of FIG. 3 |
| 410-430 | Phases of the method in FIG. 4 |
| 510-540 | Phases of the method in FIG. 5 |
| 610-630 | Phases of the method in FIG. 6 |

The invention claimed is:
1. An apparatus comprising:
at least one processing core,
at least one memory including computer program code,
the at least one memory and the computer program code being configured to, with the at least one processing core, cause the apparatus at least to:
receive from a network function producer or as an operator configuration, by a network repository function, a list of identities of vendors of which network functions are allowed to access a service provided by the network function producer;
verify, by the network repository function, that a network function consumer is allowed to access the service based at least in part on an identity of a vendor of the network function consumer being in the list;
receive from a requesting network function, by the network repository function, an access token request, wherein the access token request is related to the network function consumer requesting access to the service provided by the network function producer, wherein the access token request comprises the identity of a vendor of the network function consumer requesting access to the service;
verify, by the network repository function, based at least on the identity of the vendor of the network function consumer, that the network function consumer is allowed to access the service; and
transmit to the requesting network function, by the network repository function, an access token upon successful verification, wherein the access token is generated and signed by the network repository function and comprises the identity of the vendor of the network function consumer and an identity of a vendor of the network function producer, and wherein generation of the access token takes place only after the identity of the vendor of the network function consumer is verified by the network repository function using a local policy or profile data of the network function producer.

2. The apparatus according to claim 1, is further caused to, based on the profile data of the network function producer, verify that the network function consumer is allowed to access the service.

3. The apparatus according to claim 1, is further caused to:
receive from the requesting network function, by the network repository function, a discovery request related to the network function producer, the discovery request comprising the identity of the vendor of the network function consumer;
verify based on the identity of the vendor of the network function consumer, by the network repository function, that the network function consumer is allowed to discover the network function producer; and
transmit upon successful verification, by the network repository function, a discovery response to the requesting network function.

4. The apparatus according to claim 1, wherein the access token request further comprises the identity of a vendor of the network function producer providing the service and the apparatus is further caused to, based on the identity of the vendor of the network function producer, verify that the network function consumer is allowed to access the service.

5. An apparatus comprising:
at least one processing core,
at least one memory including computer program code,
the at least one memory and the computer program code being configured to, with the at least one processing core, cause the apparatus at least to:
transmit, by a requesting network function, a discovery request to request discovery of a network function producer, the discovery request comprising an identity of a vendor of a network function consumer and an identity of the vendor of the network function producer, wherein the identity of the vendor of the network function producer to be used by a network repository function to discover corresponding a Network Data Analytics Function, (NWDAF);
receive, by the requesting network function, a discovery response responsive to the discovery request;
transmit, by the requesting network function, an access token request to the network repository function, wherein the access token request is related to the network function consumer requesting access to a service provided by the network function producer, wherein the access token comprises the identity of the vendor of the network function consumer requesting access to the service;
receive, by the requesting network function, an access token from the network repository function, wherein the access token is signed by the network repository function and comprises the identity of the vendor of the network function consumer and the identity of the vendor of the network function producer;
transmit, by the requesting network function, the signed access token to the network function producer to request access to the service; and
receive, by the requesting network function, the service from the network function producer when the network function consumer is allowed by the network function producer to access the service.

6. The apparatus according to claim 5, wherein the access token request further comprises the identity of a vendor of the network function producer providing the service.

7. An apparatus comprising:
at least one processing core,
at least one memory including computer program code,
the at least one memory and the computer program code being configured to, with the at least one processing core, cause the apparatus at least to:
transmit to a network repository function, by a network function producer, a list of identities of vendors of which network functions are allowed to access a service provided by the network function producer;
receive from a requesting network function, by the network function producer providing a service, a signed access token, wherein the access token is signed by the network repository function and is related to a network function consumer requesting access to the service provided by a network function producer, wherein the access token comprises an identity of a vendor of the network function consumer and an identity of a vendor of the network function producer;
verify, by the network function producer, and based at least in part on the identity of the vendor of the network function consumer and the identity of the vendor of the network function producer, that the network function consumer is allowed to access the service; and
provide, by the network function producer, the service to the network function consumer upon successful verification.

8. The apparatus according to claim 7, wherein the requesting network function is the network function consumer or a service communication proxy configured to act on behalf of the network function consumer.

* * * * *